United States Patent
Gordon, II et al.

(10) Patent No.: US 6,184,856 B1
(45) Date of Patent: Feb. 6, 2001

(54) TRANSMISSIVE ELECTROPHORETIC DISPLAY WITH LATERALLY ADJACENT COLOR CELLS

(75) Inventors: Joseph Grover Gordon, II; Mark Whitney Hart; Sally Ann Swanson, all of San Jose, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/154,626

(22) Filed: Sep. 16, 1998

(51) Int. Cl.[7] ............................. G09G 3/34; G02B 26/00
(52) U.S. Cl. ................................. 345/107; 359/296
(58) Field of Search .................... 345/48, 55, 84, 345/107; 359/296; 430/32–38

(56) References Cited

U.S. PATENT DOCUMENTS

| | | | |
|---|---|---|---|
| 3,612,758 | 10/1971 | Evans et al. | 345/107 |
| 3,668,106 | * 6/1972 | Ota | 359/296 |
| 4,062,009 | 12/1977 | Raverdy et al. | 359/296 |
| 4,071,430 | 1/1978 | Liebert | 430/32 |
| 4,203,106 | * 5/1980 | Dalisa et al. | 345/107 |
| 4,218,302 | 8/1980 | Dalisa et al. | 359/296 |
| 4,272,596 | 6/1981 | Harbour et al. | 430/37 |
| 4,311,361 | * 1/1982 | Somlyody | 359/296 |
| 4,620,916 | 11/1986 | Zwemer et al. | 345/107 |
| 4,648,956 | 3/1987 | Marshall et al. | 359/296 |
| 4,650,288 | 3/1987 | White | 345/107 |
| 4,741,604 | * 5/1988 | Kornfeld | 359/296 |
| 4,833,464 | 5/1989 | Di Santo et al. | 359/296 |
| 5,041,824 | * 8/1991 | Disanto et al. | 345/107 |
| 5,077,157 | * 12/1991 | Disanto et al. | 359/296 |
| 5,223,823 | * 6/1993 | Disanto et al. | 345/107 |
| 5,254,981 | * 10/1993 | Disanto et al. | 345/107 |
| 5,276,438 | * 1/1994 | Disanto et al. | 345/107 |
| 5,293,528 | 3/1994 | Di Santo et al. | 345/107 |
| 5,298,833 | 3/1994 | Hou | 313/483 |
| 5,582,700 | * 12/1996 | Bryning et al. | 345/107 |
| 5,627,561 | * 5/1997 | Laspina et al. | 345/107 |
| 5,699,097 | * 12/1997 | Takayama et al. | 347/171 |
| 5,745,094 | 4/1998 | Gordon, II et al. | 345/107 |
| 6,017,584 | * 1/2000 | Albert et al. | 427/213.3 |

FOREIGN PATENT DOCUMENTS

| | | | |
|---|---|---|---|
| 51-130241 | 11/1976 | (JP) | G02F/1/17 |
| 55-071782 | 5/1980 | (JP) | C09K/9/02 |
| 55-105227 | 8/1980 | (JP) | G02F/1/19 |
| 59-165028 | 9/1984 | (JP) | G02F/1/19 |
| 60-087317 | 5/1985 | (JP) | G02F/1/19 |
| 60-189731 | 9/1985 | (JP) | G02F/1/19 |
| 2-189525 | 7/1990 | (JP) | G02F/1/167 |
| 2-223932 | 9/1990 | (JP) | G02F/1/167 |
| 2-223933 | 9/1990 | (JP) | G02F/1/167 |

(List continued on next page.)

OTHER PUBLICATIONS

Singer et al., "An X-Y Addressable Electrophoretic Display", Proceeding of the S.I.D., vol. 18, 3rd/4th Quarters, 1977, pp. 255–266.

(List continued on next page.)

Primary Examiner—Steven J. Saras
Assistant Examiner—Paul A. Bell
(74) Attorney, Agent, or Firm—Thomas R. Berthold

(57) ABSTRACT

A transmissive electrophoretic color display is comprised of a plurality of color pixels; each uniformly illuminated from the rear by a backlight and each comprised of at least two electrophoretic cells. Each cell is comprised of a suspension of charged, black or colored light-absorbing pigment particles in a light-transmissive fluid. Each cell is also comprised of a light-transmissive front and rear window, at least one non-obstructing counter electrode, at least one non-obstructing collecting electrode, and a color filter medium. The cells of different colors are in a laterally adjacent relationship to each other and the charged pigment particles are responsive to the electrodes. The filter medium in each cell can be a light-transmissive color filter element or the pigment suspension fluid can be colored and serve as the filter medium.

23 Claims, 4 Drawing Sheets

FOREIGN PATENT DOCUMENTS

| | | | |
|---|---|---|---|
| 2-284123 | 11/1990 | (JP) | G02F/1/167 |
| 2-284128 | 11/1990 | (JP) | G02F/1/167 |
| 3-266818 | 11/1991 | (JP) | G02F/1/167 |
| 3-284729 | 12/1991 | (JP) | G02F/1/167 |
| 4-127190 | 4/1992 | (JP) | G09F/9/37 |
| 4-166917 | 6/1992 | (JP) | G02F/1/167 |
| 4-166918 | 6/1992 | (JP) | G02F/1/167 |

OTHER PUBLICATIONS

Swank et al., "The Development of a Self–contained Instant–display Erasable Electrophoretic X–ray Imager", Journal of Applied Physics, vol. 50, No. 10, Oct. 1979, pp. 6534–6542.

Vance, "Optical Characteristics of Electrophoretic Displays", Proceeding of the S.I.D., vol. 18, 3rd/4th Quarters, 1977, pp. 267–274.

Novotny, "Applications of Nonaqueous Colloids",Elsevier Science Publishers B.V.,1987, pp.361–375.

Yamaguchi et al., "Equivalent Circuit of Ion Projection–driven Electrophoretic Display", IEICE Transactions, vol. E74, No. 12, Dec. 1991, pp. 4152–4156.

Beilin et al., "2000–Character Electrophoretic Display", SID 86 Digest, pp. 136–140.

Chiang, "Conduction Mechanism of Charge Control Agents Used in Electrophoretic Display Devices", Proceeding of the S.I.D., vol. 18, 3rd/4th Quarters 1977, pp. 275–282.

Chiang, "Electrophoretic Displays: The State of the Art", IEEE, 1980, pp. 10–12.

Croucher et al., "Electrophoretic Display: Materials as Related to Performance", Photographic Science and Engineering, vol. 25, No. 2, Mar./Apr. 1981, pp. 80–86.

Croucher et al., "Some Physicochemical Properties of Electrophoretic Display Materials", Ind. Eng. Chem. Prod. Res. Dev., vol. 20, No. 2, 1981, pp. 324–329.

Dalisa, "Electrophoretic Display Technology", Proceeding of the S.I.D., vol. 18, 1st Quarter 1977, pp. 43–50.

Dalisa, "Electrophoretic Display Technology", IEEE Transactions on Electron Devices, vol. ED–24, No. 7, Jul. 1977, pp. 827–834.

Dalisa, "Electrophoretic Displays", Top. Appl. Phys., vol. 40, 1990, pp. 213–232.

Fitzhenry, "Identification of a Charging Mechanism Using Infrared Spectroscopy", Applied Spectroscopy, vol. 33, No. 2, 1979, pp. 107–110.

Fitzhenry, "Optical Effects of Adsorption of Dyes on Pigment Used in Electrophoretic Image Display", Applied Optics, vol. 18, No. 19, Oct. 1, 1979, pp. 3332–3337.

Fitzhenry–Ritz, "Optical Properties of Electrophoretic Image Display", IEEE, 1980, pp. 13–25.

Fitzhenry–Ritz, "Optical Properties of Electrophoretic Image Displays", IEEE Transactions on Electron Devices, vol. ED–28, No. 6, Jun. 1981, pp. 726–735.

Hopper et al., "An Electrophoretic Display, Its Properties, Model, and Addressing", IEEE Transactions on Electron Devices, vol. ED–26, No. 8, Aug. 1979, pp. 1148–1152.

Liebert et al., "A 512 Character Electrophoretic Display", IEEE, 1980, pp. 26–30.

Murau et al., "The Understanding and Elimination of Some Suspension Instabilities in an Electrophoretic Display", Journal of Applied Physics, vol. 49, No. 9, Sep. 1978, pp. 4820–4829.

Murau, "Characteristics of an X–Y Addressed Electrophoretic Display (EPID)", SID 84 Digest, 1984, p. 141.

Novotny et al., "Optical and Electrical Characterization of Electrophoretic Displays", Journal of the Electrochemical Society, vol. 126, No. 12, Dec. 1979, pp. 2211–2216.

Shiffman et al., "An Electrophoretic Image Display with Internal NMOS Address Logic and Display Drivers", Proceedings of the SID, vol. 25, No. 2, 1984, pp. 105–115.

\* cited by examiner

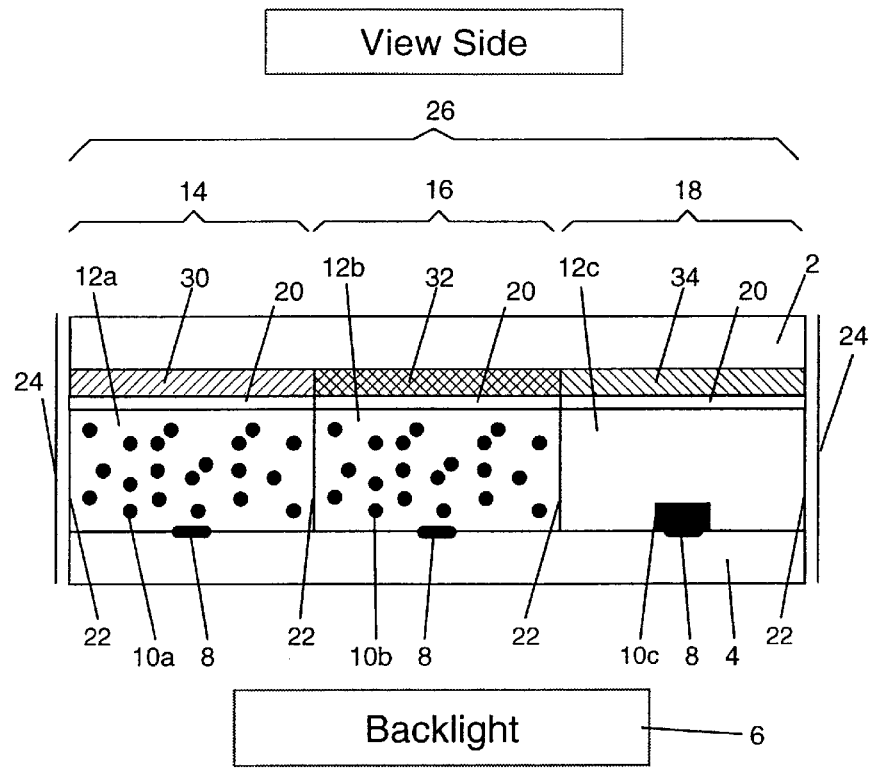
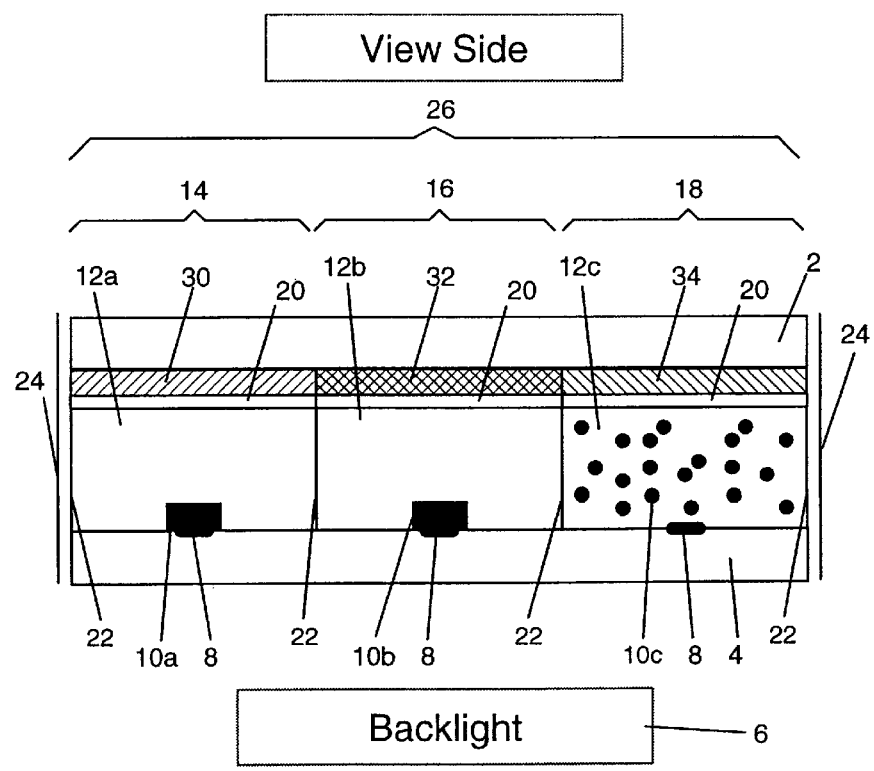

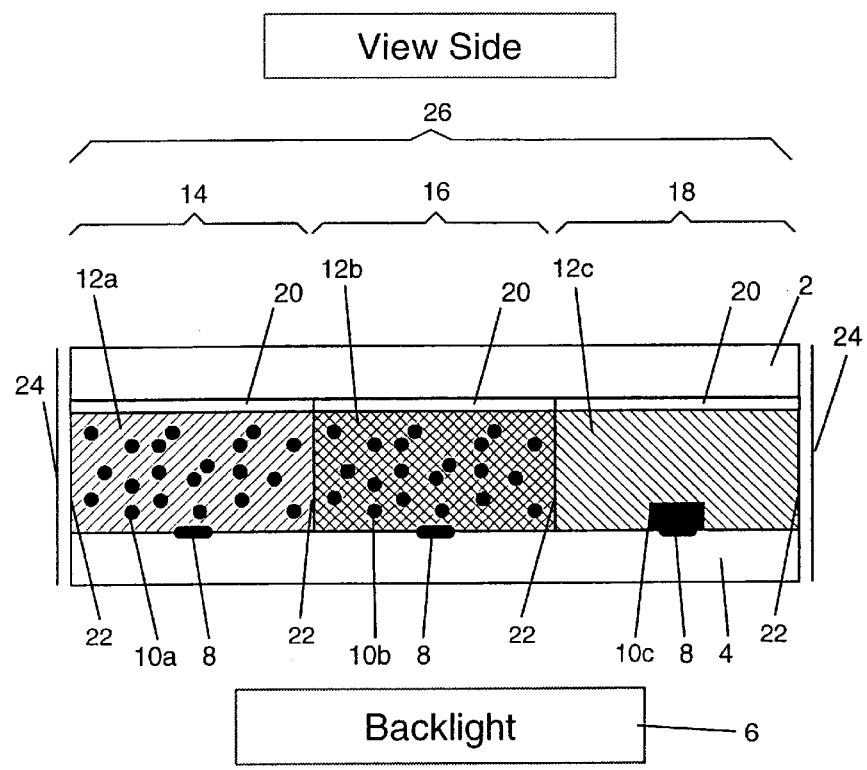
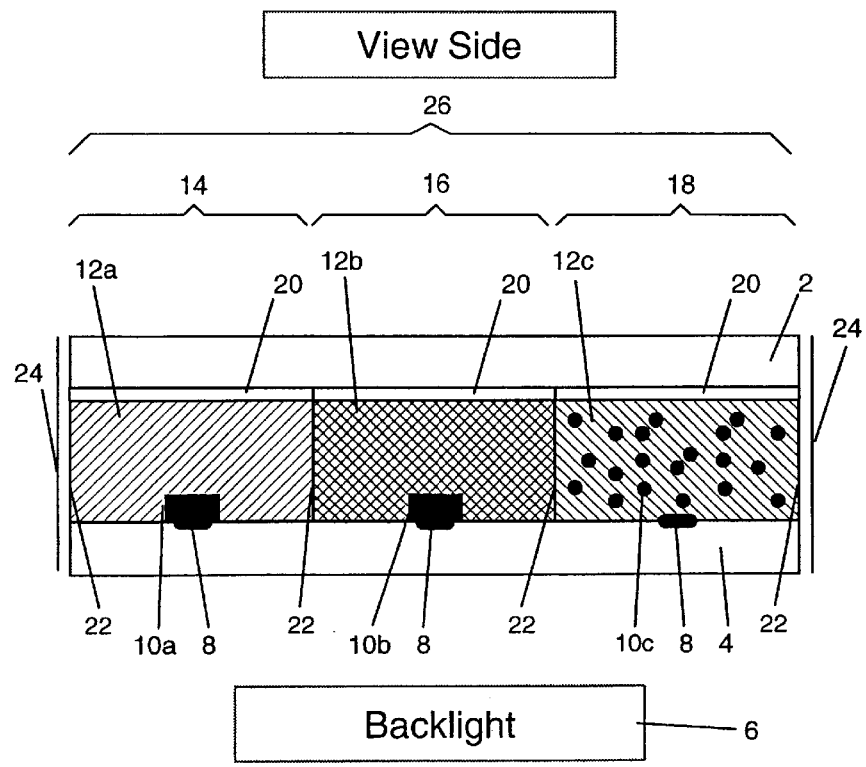

TRANSMISSIVE ELECTROPHORETIC DISPLAY WITH LATERALLY ADJACENT COLOR CELLS

RELATED APPLICATIONS

This application is related to two concurrently filed co-pending applications, Ser. Nos. 09/154,114 and 09/154,284.

TECHNICAL FIELD

The present invention relates to electrophoretic cells which form an electrophoretic display. In particular the invention relates to a cell configuration for use in a electrophoretic color display operating in a light-transmissive mode.

BACKGROUND OF THE INVENTION

An electrophoretic cell is a cell comprised of pigment particles suspended in a fluid and uses electrophoresis to switch between the following two states:

Distributed State: Particles are positioned to cover the horizontal area of the cell. This can be accomplished, for example, by dispersing the particles throughout the cell, by forcing the particles to form a layer on the horizontal surfaces of the cell, or by some combination of both.

Collected State: Particles are positioned to minimize their coverage of the horizontal area of the cell, thus allowing light to be transmitted through the cell. This can be accomplished, for example, by compacting the particles in a horizontal area that is much smaller than the horizontal area of the cell, by forcing the particles to form a layer on the vertical surfaces of the cell, or by some combination of both.

The electrophoretic cell can serve as a light valve since the distributed and collected states can be made to have different light absorbing and/or light scattering characteristics. As a result, an electrophoretic cell can be placed in the light path between a light source and a viewer and can be used to regulate the appearance of a pixel in a display.

Transmissive color displays are known that use liquid crystals and crossedpolarizers to control the intensity of the light through the color filters in each pixel. The use of linear polarizers limits the transmission of light through the display and, hence, the backlight efficiency, brightness and power efficiency of these displays is reduced. These displays also suffer from limited viewing angle. Electrophoretic displays can offer improved transmission characteristics combined with extremely low power requirements.

Electrophoretic color displays have been proposed in the prior art. Evans, et al., in U.S. Pat. No. 3,612,758, describe a two-color electrophoretic display having pigment particles of a single color in a contrasting dye solution. In this scheme, under the influence of an electric field, the particles migrate to a front transparent electrode and the viewer sees the color of the particles. When the field is reversed, the particles migrate away from the front transparent electrode, are hidden in the dye solution, and the viewer sees the color of the dye solution.

Japanese Patent No. JP 1267525 assigned to Toyota Jidosha KK describes a electrophoretic color display having colored (blue and yellow) particles with different zeta potentials in a solution of red dye to give a multicolored (yellow, green and red) display. When a certain voltage is applied to the pixels, the yellow particles are pulled to the front transparent electrode and the viewer sees yellow. At a higher voltage, the blue particles are also pulled to the front electrode and the viewer sees green. When the particles are pulled off the transparent electrode, the colors of the particles are hidden by the dye solution and the viewer sees red.

Hou, in WO 94/28202, describes electrophoretic color display with a dispersion comprised of two differently colored particles that are oppositely charged. The polarity of the voltage applied to the cell determines the polarity of the particle attracted to the front transparent electrode, and hence determines the color seen by the viewer.

In the electrophoretic color display references cited above, the use of a backlight is not suggested nor would these embodiments have contrast in a transmissive mode of operation. Transmissive electrophoretic displays based on backlit operation, however, have been proposed in the prior art.

Dalisa, et. al., in U.S. Pat. No. 4,218,302, describe a transmissive electrophoretic display that uses particles to either allow or frustrate the total internal reflection of light at the interface between the interior of the rear window and the suspension fluid. In the regions of this interface where no particles are present, the conditions for total internal reflection are satisfied, and light from the source is reflected back towards the source and the viewer sees no light. In the regions of this interface where the particles are present, the conditions for total internal reflection are frustrated, and light from the source passes through the interface and the viewer sees light.

Marshall et al., in U.S. Pat. No. 4,648,956, describes several embodiments of a transmissive electrophoretic display. In these embodiments the suspension is contained between a transparent, large-area upper electrode and a small-area lower electrode. When the absorbing particles in a selected region of the display are collected on the small-area lower electrode, they cover only a small portion of the horizontal area of the selected region. As a result, most of the light from the source passes through the selected region without being absorbed and the viewer sees light. When the absorbing particles are drawn to the upper electrode, they cover substantially the horizontal area of the selected region so that most of the light from the source is absorbed before it can reach the viewer and the viewer sees dark.

Hou, in U.S. Pat. No. 5,298,833, describes a transmissive electrophoretic display based on a conductive mesh screen disposed between the backlight and the viewer. The mesh screen covers the viewing area of the display and is immersed in a suspension comprised of black particles in a clear fluid. Particles are either drawn to, or removed from a selected area of the mesh by using patterned transparent electrodes disposed above and below the mesh. When the black particles are drawn to the mesh they sit on the mesh without completely covering its holes. Light from the source is transmitted through the holes and the viewer sees light. When the particles are removed from the mesh, they are drawn to cover the selected transparent electrode. Light from the source is substantially absorbed in the area covered by the electrode and the viewer sees dark.

There is a continuing need in the art for a low-power electrophoretic color display with high brightness, wide viewing angle, and large color gamut. It is therefore an object of the present invention to provide a transmissive electrophoretic color display possessing these characteristics. Other objects and advantages will become apparent from the following disclosure.

SUMMARY OF THE INVENTION

The present invention is a transmissive electrophoretic color display. The display is intended to be viewed while illuminated from the rear by a backlight. The display is comprised of many picture elements or pixels located in lateral adjacency in a plane. The pixels are comprised of two or more sub-pixels, or cells, which are also located in lateral adjacency in a plane. Each cell transmits a different color. The color of a pixel is determined by the additive mixture of the colors transmitted by each of its respective cells.

Each cell is comprised of a light-transmissive front and rear window, at least one non-obstructing counter electrode, at least one non-obstructing collecting electrode, and a color filter medium. Each cell also contains a suspension of charged, light-absorbing pigment particles in a light-transmissive fluid.

The amount of colored light transmitted by each cell is controlled by the position of the pigment particles within the cell. The position, in turn, is directed by the application of appropriate voltages to the collecting and counter electrodes. When the pigment particles are positioned in the path of the light, the light entering the rear window from the backlight is significantly attenuated before emerging from the front window, and the viewer sees dim color or black. When the pigment particles are substantially removed from the path of the light, light entering the rear window can pass through the front window to the viewer without significant attenuation, and the viewer sees the color transmitted by the color filter medium. The color filter medium can be a light-transmissive colored filter element, or the pigment suspension fluid itself can be colored and serve as the color filter medium.

A more thorough disclosure of the present invention is presented in the detailed description that follows and from the accompanying drawings.

BRIEF DESCRIPTION OF THE DRAWINGS

FIGS. 1a and 1b are sectional views of a first embodiment of an electrophoretic display cell of the present invention.

FIGS. 3a and 3b are sectional views of a third embodiment of an electrophoretic display cell of the present invention.

DESCRIPTION OF THE PREFERRED EMBODIMENTS

Figure 2A:
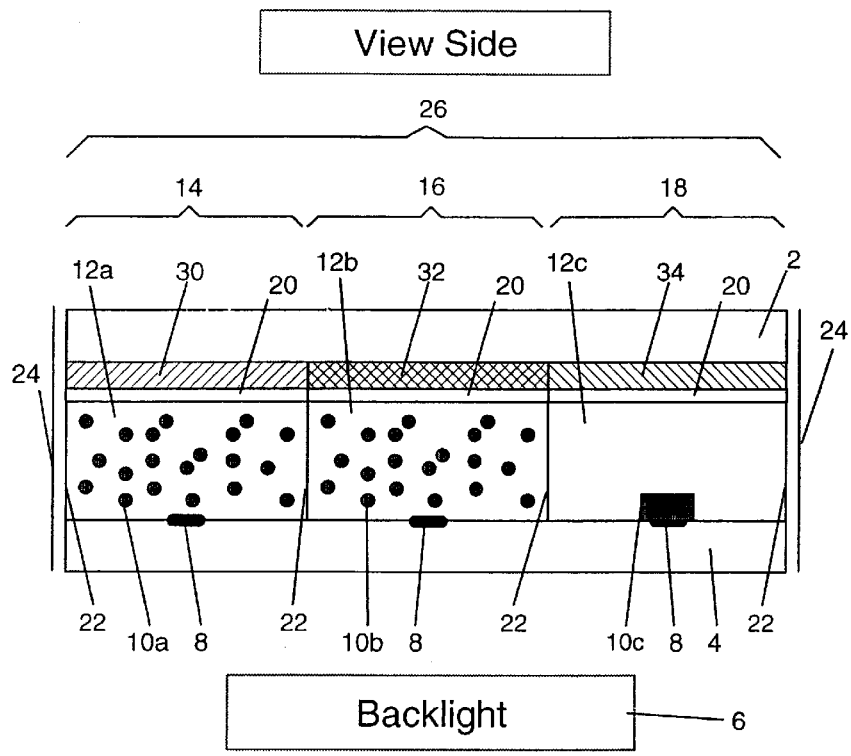
FIGS. 2a and 2b are sectional views of a second embodiment of an electrophoretic display cell of the present invention.

The present invention relates to a transmissive electrophoretic color display. The display is intended to be viewed while illuminated from the rear by a backlight. The display is comprised of many picture elements or pixels located in lateral adjacency in a plane. The pixels are comprised of two or more sub-pixels, or cells, which are also located in lateral adjacency in a plane. Each cell transmits a different color. The color of a pixel is determined by the additive mixture of the colors transmitted by each of its respective cells.

Each cell is comprised of a light-transmissive front and rear window, at least one non-obstructing counter electrode, at least one non-obstructing collecting electrode, and a color filter medium. Each cell also contains a suspension of charged, light-absorbing pigment particles in a light-transmissive fluid.

The amount of colored light transmitted by each cell is controlled by the position of the pigment particles within the cell. The position, in turn, is directed by the application of appropriate voltages to the collecting and counter electrodes. In the extreme these produce two states: a distributed state and a collected state. In the distributed state, the pigment particles are positioned in the path of the light so that the light entering the rear window from the backlight is significantly attenuated before emerging from the front window, and the viewer sees dim color or black. In the collected state, the particles are substantially removed from the path of the light so that light entering the rear window can pass through the front window to the viewer without significant attenuation, and the viewer sees the color transmitted by the color filter medium.

The suspension is minimally comprised of pigment particles and a lighttransmissive fluid. The suspension is preferably highly stable with both time and use. The suspension is preferably highly resistant to agglomeration, flocculation, and sticking to the surfaces in the cell, even after being compacted and redispersed many times. The suspension preferably doesn't react with the surfaces the cell. The specific gravity of the pigment particles and the fluid are preferably similar. The pigment particles preferably acquire a single polarity when placed in suspension.

Optionally, other components may be added to the suspension such as charge control additives, dispersants, and surfactants to improve the performance of the suspension. Suitable additives include sodium dioctylsulfosuccinate, zirconium octoate, and metal soaps such as lecithan, barium petronate, calcium petronate, alkyl succinimide, iron naphthenate, and polyethylene glycol sorbitan stearate.

The suspension fluid must transmit the color of light transmitted by the color filter medium. The fluid can be colorless or colored with either a dye and/or pigment. The fluid preferably has minimum solvent action on the pigments and does not react with the surfaces in the cell. The fluid is preferably dielectric and substantially free of ions. The fluid preferably has a low viscosity. The fluid can be a mixture of fluids. Suitable fluids include silicone fluids such as hexamethyldisiloxane, octamethyltrisiloxane, decamethyltetrasiloxane, and other poly(dimethylsiloxane)s. Suitable fluids also include hydrocarbons such as decane, dodecane, tetradecane, xylene, Sohio odorless solvent (a kerosene fraction available from Exxon Company), toluene, hexane and Isopar® C, E, G, H, K, L, M, and V and Norpar® 12, 13, and 15 (branched and linear saturated aliphatic hydrocarbons available from Exxon Company).

The pigment particles must absorb the color of light transmitted by the color filter medium. The pigment particles can be black or colored. Suitable colors include red, green, blue, cyan, magenta, yellow, or the like. Suitable classes of inorganic pigments include:
Cadmium Red
Cadmium sulfo-selenide (black)
Carbon Black
Chromium oxide (green)
Iron oxides (black)
Iron oxides (red)
Lead chromate (yellow)
Manganese dioxide (brown)
Silicon monoxide (reddish brown)
Sulfur (yellow)
Vermilion Red
Suitable classes of organic pigments include:
Anthracene (fluorescent blue, fluorescent yellow)
Anthraquinone (blue, red, yellow)
Azonaphthols (magenta)
Azopyridone (yellow)
Heterocyclic Azo (cyan, magenta)

Methine (yellow)
Nigrosines (black)
Phthalocyanine (blue, green, cyan)
Quinacridone (magenta)
Suitable opaque pigment particles include:
Anric Brown (C.I. Pigment Brown 6)
Cabot Mogul L (black)
C.I. Direct Yellow 86
C.I. Direct Blue 199 (cyan)
C.I. Food Black 2
Dalama® Yellow (Pigment Yellow 74)
Hansa® Yellow (Pigment Yellow 98)
Indo® Brilliant Scarlet (Pigment Red 123)
Monastral® Green G (C.I. Pigment Green 7)
Monastral® Blue B (C.I. Pigment Blue 15)
Monastral® Blue G (C.I. Pigment Blue 15)
Monastral® Green B (C.I. Pigment Green 7)
Paliotol® Black L0080 (C.I. Pigment Black 1)
Permanent Rubine F6BI3-1731 (Pigment Red 184)
Pigment Scarlett (C.I. Pigment Red 60)
Quindo® Magenta (Pigment Red 122)
Stirling NS N 77Y (Pigment Black 7)
Toluidine Red B (C.I. Pigment Red 3)
Toluidine Red Y (C.I. Pigment Red 3)
Toluidine Yellow G (C.I. Pigment Yellow)
Watchung® Red B (C.I. Pigment Red 48)

Other suitable pigment particles will be known to those skilled in the art such as those disclosed in U.S. Pat. Nos. 5,200,289 and 4,631,244.

The collecting and counter electrodes in each cell are constituted or sized or positioned to be non-obstructing. This means that in the collected state, neither the particle coated collecting electrode nor the counter electrode unacceptably interferes with the passage of the desired color of light as it travels through the cell, i.e., substantially all of the incident light of the desired color is transmitted through the cell.

A non-obstructing collecting electrode can be realized by allowing it to occupy only a small fraction of the horizontal area of the cell by, for example, forming it into a narrow line or a small pedestal. It can also be realized by disposing it along a vertical wall in the cell. A non-obstructing counter electrode can be realized similarly or, alternatively, by coating the inside surface of the front window and/or rear window with a layer of conductive, light-transmissive material such as indium tin oxide.

There can be one or more non-obstructing collecting electrodes and one or more non-obstructing counter electrodes in each cell and either electrode can be common to more than one cell. The electrodes are preferably good conductors (e.g., aluminum, chromium, copper, nickel), can be light-transmissive (e.g., indium tin oxide), and can be disposed vertically and/or horizontally in the cell. Examples of various electrode configurations are described in IBM's U.S. Pat. No. 5,745,094.

The color filter medium selects the color transmitted by each cell. The color filter medium can be, for example, a light-transmissive colored filter element disposed across the horizontal area of the cell, either above or below the suspension. An appropriately colored pigment suspension fluid can also serve as the color filter medium.

The following example is a detailed description of a display of the present invention. The details fall within the scope of, and serve to exemplify, the more general description set forth above. The example is presented for illustrative purposes only, and is not intended as a restriction on the scope of the invention.

Referring to FIG. 1a and 1b through 4a and 4b there are illustrated preferred embodiments of electrophoretic display cells in accordance with the present invention. Each cell 14, 16, and 18 generally comprises a front lighttransmissive window 2 and a rear light-transmissive window 4 illuminated by a backlight 6. Each cell 14, 16, 18 has a non-obstructing collecting electrode 8 and a light-transmissive counter electrode 20 disposed within the cell and spaced apart as illustrated. Each cell 14, 16, and 18 also has a suspension comprised of pigment particles 10a, 10b, and 10c, respectively, in a light-transmissive fluid 12a, 12b, and 12c, respectively, in the space between the front window 2 and the rear window 4. The light-transmissive fluids 12a, 12b, 12c in cells 14, 16, and 18, respectively, are separated by barriers 22. Electrophoretic cell 14 is associated with a red filter medium, electrophoretic cell 16 is associated with a green filter medium, and electrophoretic cell 18 is associated with a blue filter medium. The three laterally adjacent cells 14, 16, and 18 create an electrophoretic transmissive color pixel 26. There are also shown two walls 24 to figuratively demarcate the sides of each pixel 26. These side pixel walls 24 are shown for illustrative purpose and may not be present in the actual embodiment.

In the embodiments illustrated in FIG. 1a and 1b through 4a and 4b, the collecting electrodes 8 represent individually addressable conducting lines whose horizontal area is much smaller than the horizontal area of the cell. The counter electrode 20 represents a light-transmissive conductor and is shared by all the cells 14, 16, and 18 in the pixel 26. The distributed state of the cells 14, 16, and 18 are illustrated as one in which the respective particles 10a, 10b, and 10c are generally uniformly dispersed throughout their respective suspension fluids 12a, 12b, 12c. The collected state of the cells 14, 16, and 18 are illustrated as one in which the particles have accumulated on their respective collecting electrodes 8.

The arrangement of FIGS. 1a and 1b includes a red filter element 30 in cell 14, a green filter element 32 in cell 16, and a blue filter element 34 in cell 18. These light-transmissive filter elements 30, 32, 34 are respectively located across the lower surface of the front window 2, between the front window 2 and the counter electrode 20, and are in lateral adjacency in a plane with each other. Each filter element may also be located within the front window, either by embedding a separate filter element within the front window, or by tinting the front window the desired color. The filter elements may also be located on the front surface of the front window. Similarly, the filter elements may be located between the cell and the rear window 4, within the rear window, or on the outer surface of the rear window.

In both FIGS. 1a and 1b the pigment particles 10a, 10b, and 10c are black. In FIG. 1a, cells 14 and 16 are shown in the distributed state. Since the black absorbing particles 10a and 10b are distributed over the horizontal area of these cells, light from the backlight 6 entering cells 14 and 16 is substantially absorbed before it reaches the viewer. Consequently, cells 14 and 16 appear black to the viewer. Cell 18 of FIG. 1a is shown in the collected state. Since the black absorbing particles 10c are collected in a small horizontal area of this cell, and since the suspension fluid 12c transmits the color of light transmitted by the blue filter element 34, light from the backlight 6 incident on the rear window 4 is substantially transmitted through both the blue filter element 34 and the front window 2. Consequently, cell 18 appears blue to the viewer. Since cells 14 and 16 transmits substantially no light and cell 18 transmits blue light, the pixel 26 will appear blue to the viewer.

FIG. 1b shows the complementary state of FIG. 1a—cells 14 and 16 are in the collected state and cell 18 is in the distributed state. As a result, cells 14 and 16 will transmit red and green light, respectively, and cell 18 will transmit substantially no light. Consequently, the pixel 26 transmits both red and green light and will appear yellow to the viewer.

Figure 2B:
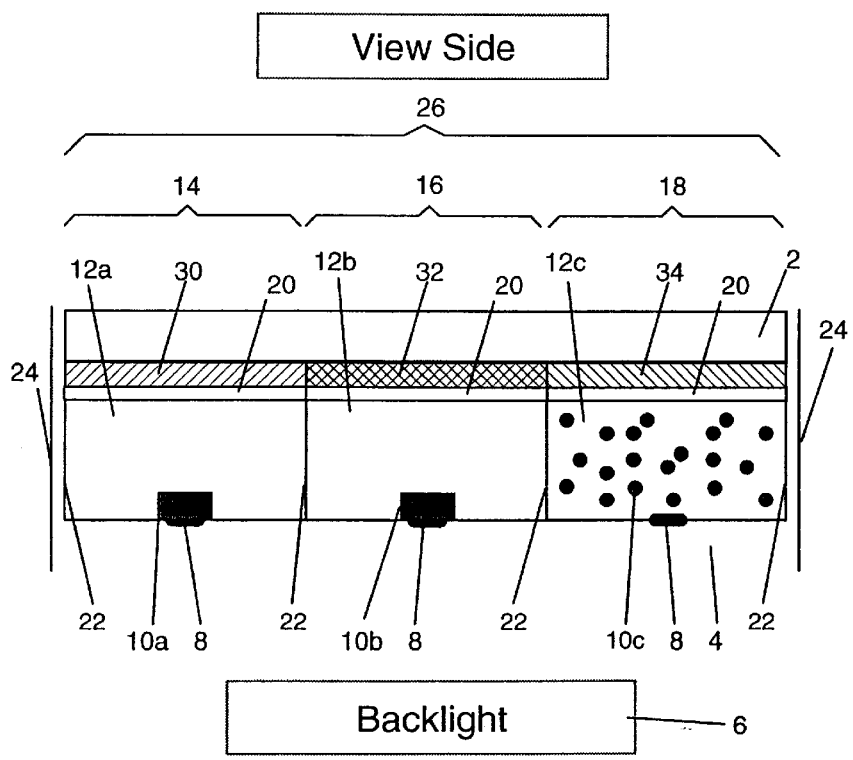

FIGS. 2a and 2b illustrate an arrangement similar to that illustrated in FIG. 1a and 1b. The difference is that instead of using black pigment particles 10a, 10b, and 10c, the pigment particles 10a associated with the red filter 30 in cell 14 are cyan, the pigment particles 10b associated with the green filter 32 in cell 16 are magenta, and the pigment particles associated with the blue filter 34 in cell 18 are yellow. Since the respective pigment colors are complementary to their associated filter colors, the pigment particles absorb the color of light transmitted by their associated color filter so that the cell, in its distributed state, will transmit substantially no light.

In the arrangement illustrated in FIGS. 3a and 3b, the filter medium is constituted by a red colored suspension fluid 12a in cell 14, a green colored suspension fluid 12b in cell 16, and a blue colored suspension fluid 12c in cell 18. There are no separate filter elements 30, 32, and 34. The pigment particles 10a, 10b, and 10c are black and therefore absorb the color of the light transmitted by the colored suspension fluid. In the distributed state, the particles absorb the color of the light transmitted by the colored fluid, and the cell appears dark or black. In the collected state, substantially all the light can pass through the cell without being absorbed by the particles and the color of the respective suspension fluid 12a, 12b, 12c in the cells 14, 16, 18 is transmitted.

Figure 4A:
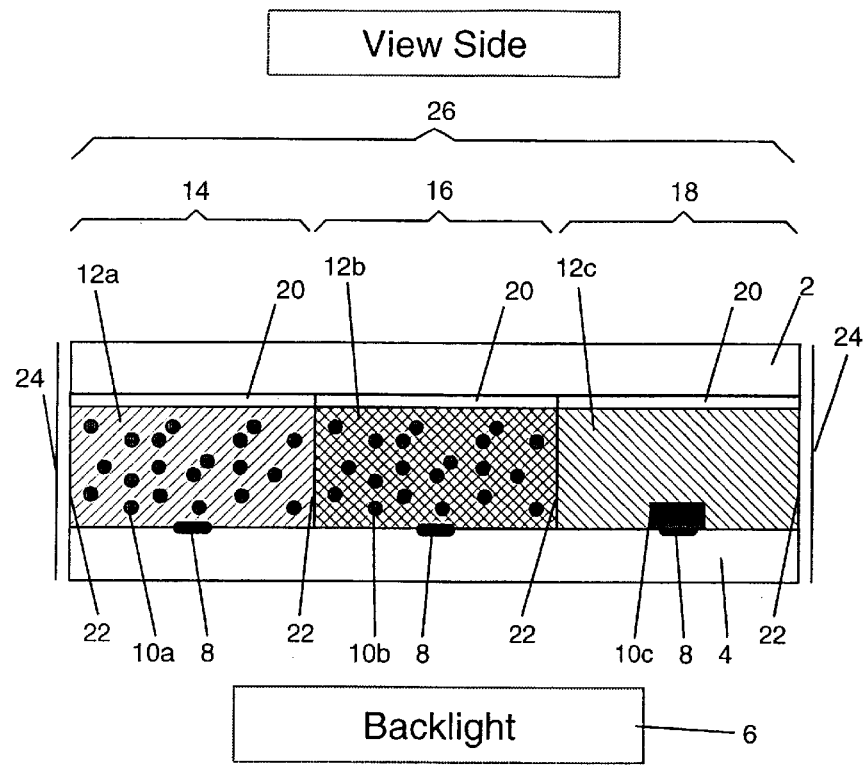
FIGS. 4a and 4b are sectional views of a fourth embodiment of an electrophoretic display cell of the present invention.
Figure 4B:
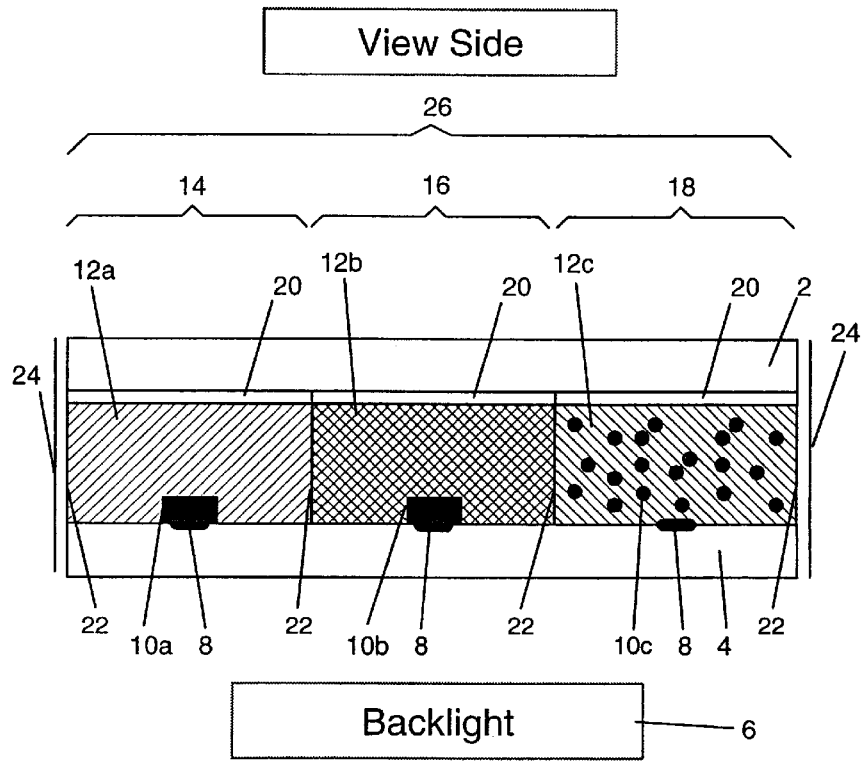

The arrangement illustrated in FIGS. 4a and 4b is similar to that illustrated in FIGS. 3a and 3b. The difference is that instead of using black pigments particles 10a, 10b, and 10c, the pigment particles 10a associated with the red suspension fluid 12a in cell 14 are cyan, the pigment particles 10b associated with the green suspension fluid 12b in cell 16 are magenta, and the pigment particles 10c associated with the blue suspension fluid 12c in cell 18 are yellow. Since the respective pigment colors are complementary to their associated suspension fluid colors, the pigment particles absorb the color of light transmitted by their associated suspension fluid so that the cell, in its distributed state, will transmit substantially no light. In this case, for maximum visual contrast, the distributed state is preferably one that prevents the viewer from directly seeing the particles. For example, the distributed state in this case is preferably not one in which the particles are distributed in a slab along the surface of the counter electrode 20.

Other embodiments of this invention can use different color combinations for the cells within the pixel. For example, the particles in FIGS. 2a–2b and 4a–4b need not be a color complementary to the color of their associated color filter medium; they need only be a color that absorbs the color of light transmitted by their associated colored suspension fluid. In addition, some components in the illustrations above may not be necessary or could be modified in other embodiments. For example, in the embodiments illustrated in FIGS. 1a–1b the barriers 22 are not necessary—the cells 14, 16, and 18 can share the same suspension. In the embodiments illustrated in FIGS. 2a–2b the barriers 22 need only be impervious to the pigment particles—the cells 14, 16, and 18 can share the same suspension fluid.

Although this invention has been described with respect to specific embodiments, the details thereof are not to be construed as limitations for it will be apparent that various embodiments, changes, and modifications may be resorted to without departing from the spirit and scope thereof. Further, it is understood that such equivalent embodiments are intended to be included within the scope of this invention.

What is claimed is:

1. An electrophoretic display comprising:
   a light-transmissive rear window;
   a light-transmissive front window;
   a plurality of cells located between the rear and front windows, each cell containing charged light-absorbing pigment particles in a light-transmissive fluid, and wherein laterally adjacent cells are grouped together to form multicolor pixels;
   a collecting electrode positioned within each cell to be substantially nonobstructive to light for collecting pigment particles in the cells to remove them out of the path of light when the rear window is illuminated from behind so that light can reach the front window without significant attenuation;
   a counter electrode substantially non-obstructive to light and cooperative with the collecting electrode for dispersing the pigment particles generally uniformly throughout the light-transmissive fluid in the cells, whereby the dispersed pigment particles substantially block the path of light when the rear window is illuminated from behind so that the light is significantly attenuated before reaching the front window; and
   a color filter medium associated with each cell for displaying an associated color at the front window when the rear window is illuminated from behind and the pigment particles are located on the collecting electrode.

2. The display according to claim 1 wherein the color filter medium associated with each cell is a colored filter element, the color of each filter element in a cell of a pixel being different from the colors of the filter elements associated with the other cells of the same pixel.

3. The display according to claim 2 wherein each filter element is located between the respective cell and the front window.

4. The display according to claim 2 wherein each filter element is located within the front window.

5. The display according to claim 2 wherein each filter element is located on the front surface of the front window.

6. The display according to claim 2 wherein each filter element is located between the respective cell and the rear window.

7. The display according to claim 2 wherein each filter element is located within the rear window.

8. The display according to claim 2 wherein each filter element is located on the outer surface of the rear window.

9. The display according to claim 2 wherein there are three cells for each pixel, wherein a first cell includes a red filter element, a second cell includes a green filter element, and a third cell includes a blue filter element.

10. The display according to claim 9 wherein the pigment particles in all of the cells are black.

11. The display according to claim 9 wherein the pigment particles in the cell having the red filter element are cyan, the pigment particles in the cell having the green filter element are magenta, and the pigment particles in the cell having the blue filter element are yellow.

12. The display according to claim 1 wherein the color filter medium associated with each cell is a colored fluid, the color of the fluid in each cell in a pixel being different from the colors of the fluids in the other cells of the same pixel.

13. The display according to claim 12 wherein there are three cells for each pixel, wherein a first cell includes a red fluid, a second cell includes a green fluid, and a third cell includes a blue fluid.

14. The display according to claim 13 wherein the pigment particles in all of the cells are black.

15. The display according to claim 13 wherein the pigment particles in the cell having the red fluid are cyan, the pigment particles in the cell having the green fluid are magenta, and the pigment particles in the cell having the blue fluid are yellow.

16. The display according to claim 1 further comprising a backlight located behind the rear window for passing light through the rear window and the cells to the front window for observation by a viewer of the display.

17. An electrophoretic display comprising:

a light-transmissive rear window;

a light-transmissive front window;

a plurality of cells located between the rear and front windows, each cell containing charged light-absorbing black pigment particles in a light-transmissive fluid, and wherein laterally adjacent cells are grouped together in threes to form multicolor pixels;

a collecting electrode and a counter electrode associated with each cell, the electrodes being substantially non-obstructive to light and electrically cooperative with one another for removing pigment particles in the cells from the path of light and collecting them on the collecting electrode substantially out of the path of light when the rear window is illuminated from behind so that light can reach the front window without significant attenuation, and for dispersing the pigment particles generally uniformly throughout the fluid in the cells to substantially block the path of light when the rear window is illuminated from behind so that the light is significantly attenuated before reaching the front window;

a red filter element associated with a first cell of each pixel, a green filter element associated with a second cell of each pixel, and a blue filter element associated with a third cell of each pixel; and a backlight located behind the rear window for passing light through the rear window and the cells to the front window for observation by a viewer of the display.

18. The display according to claim 17 wherein each filter element is located between the respective cell and the front window.

19. The display according to claim 17 wherein each filter element is located within the front window.

20. The display according to claim 17 wherein each filter element is located on the front surface of the front window.

21. The display according to claim 17 wherein each filter element is located between the respective cell and the rear window.

22. The display according to claim 17 wherein each filter element is located within the rear window.

23. The display according to claim 17 wherein each filter element is located on the outer surface of the rear window.

* * * * *